US007841232B2

(12) United States Patent
Schleif et al.

(10) Patent No.: US 7,841,232 B2
(45) Date of Patent: Nov. 30, 2010

(54) METHOD OF DYNAMICALLY MEASURING STIFFNESS OF A WHEEL AND TIRE ASSEMBLY

(75) Inventors: Kurt K. Schleif, Greenville, SC (US); Jochen E. Scheuing, Canton, MI (US); David M. Russell, Ann Arbor, MI (US); William J. Fox, Sterling Heights, MI (US); Elton R. Eaton, III, Bloomfield, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 79 days.

(21) Appl. No.: 12/243,999

(22) Filed: Oct. 2, 2008

(65) Prior Publication Data

US 2010/0083745 A1  Apr. 8, 2010

(51) Int. Cl.
*G01M 17/02* (2006.01)
(52) U.S. Cl. ........................................... 73/146
(58) Field of Classification Search .................. None
See application file for complete search history.

(56) References Cited

U.S. PATENT DOCUMENTS

| 4,404,848 | A | | 9/1983 | Iwama et al. | |
|---|---|---|---|---|---|
| 5,616,839 | A | | 4/1997 | Chen et al. | |
| 5,773,717 | A | * | 6/1998 | Reinhardt et al. | 73/146 |
| 6,065,331 | A | * | 5/2000 | Fukasawa | 73/146 |
| 6,366,364 | B1 | | 1/2002 | Parker et al. | |
| 7,082,816 | B2 | | 8/2006 | Zhu | |
| 7,140,242 | B1 | * | 11/2006 | Poling et al. | 73/146 |
| 7,295,948 | B2 | * | 11/2007 | Jetter | 702/155 |
| 2002/0143506 | A1 | * | 10/2002 | D'Aligny et al. | 703/6 |
| 2006/0231191 | A1 | * | 10/2006 | Mawby et al. | 156/110.1 |
| 2007/0084541 | A1 | | 4/2007 | Moriguchi et al. | |
| 2007/0204684 | A1 | * | 9/2007 | Muhlhoff et al. | 73/146 |
| 2008/0158569 | A1 | * | 7/2008 | Maehner et al. | 356/458 |
| 2009/0000371 | A1 | * | 1/2009 | Hanada | 73/146 |
| 2010/0013916 | A1 | * | 1/2010 | Maehner | 348/125 |

FOREIGN PATENT DOCUMENTS

JP        02-031106        1/1990

* cited by examiner

*Primary Examiner*—Andre J Allen
(74) *Attorney, Agent, or Firm*—Frederick Owens; Brooks Kushman P.C.

(57) ABSTRACT

A test machine and method for dynamically testing a tire/wheel assembly. A first laser measurement gage is directed to an inboard rim flange of the wheel to measure radial deflection of the tire/wheel assembly. A second laser measurement gage is directed to the inboard rim flange to measure axial deflection of the tire/wheel assembly. Displacement data and loading data are correlated to provide values for lateral stiffness, radial stiffness and ride stiffness.

16 Claims, 2 Drawing Sheets

METHOD OF DYNAMICALLY MEASURING STIFFNESS OF A WHEEL AND TIRE ASSEMBLY

BACKGROUND

1. Field of the Invention

The present invention relates to a method and apparatus for dynamically measuring the stiffness of a tire and wheel assembly.

2. Background Art

The stiffness of a wheel rim can effect the ride, steering, and handling of a vehicle. Wheel styling, durability and other parameters may impact the stiffness of a wheel. If the stiffness of a wheel changes, the suspension tuning in the design process may be impacted. Changes in wheel stiffness may require changes in base vehicle tuning which, in turn, may require component design changes.

There is a need for a method to assess wheel assembly stiffness when the tire is assembled to the wheel in a simulated road test environment. Current physical testing and finite element analysis (FEA) methods do not adequately capture the wheel deflections or the complex wheel to tire interface since the constraints imposed on the system are not necessarily representative of actual driving conditions.

There is a need for a method of assessing effect of wheel assembly stiffness on vehicle dynamics under actual dynamic conditions that simulate vehicle driving conditions for both lightly loaded and heavily loaded conditions. By understanding the effects of wheel assembly stiffness, program development teams may be able to better assess the effect of a wheel design change made during the development process and control the extent of wheel assembly stiffness changes made during the development process. This will help ensure the realization of vehicle tuning objectives relating to ride, steering and handling of a vehicle.

The above problems are addressed by the method and apparatus as summarized and described below.

SUMMARY OF THE INVENTION

A test machine for testing a tire assembled to a wheel, or a tire/wheel assembly, has a power driven endless belt and a wheel retention structure to which the tire/wheel assembly is attached with the tire rotating on the endless belt. The test machine includes a first laser measurement gage that is directed to an inboard rim flange of the wheel to measure radial deflection of the tire/wheel assembly. The test machine also includes a second laser measurement gage that is directed to the inboard rim flange to measure axial deflection of the tire/wheel assembly.

According to other aspects of the present development, the test machine includes a data processing system that receives a plurality of measurement values from first and second laser measurement gages. The wheel retention structure has a vertical load application system that may be selectively adjusted to simulate the application of selected vertical loads on the tire/wheel assembly. The test machine may further include a steering input system that may be selectively adjusted to simulate the application of lateral forces on the tire/wheel assembly. The vertical load application system may be adjusted to simulate the application of selected vertical load levels on the tire/wheel assembly while the steering input system is adjusted to develop lateral forces that are a predetermined function of the vertical load levels applied by the load application system.

First and second laser measurement gages are supported by a fixture that retains the gages near the tire/wheel assembly after it is attached to the wheel retention structure. At least one of the laser measurement gages may include a mirror that is attached to the fixture within the radial plane of the inboard rim flange.

The plurality of measurement values obtained from the first and second laser measurement gages may be used to develop a radial displacement profile, a lateral displacement profile, and a value for ride stiffness.

According to another aspect of the present development, a method of testing a wheel/tire assembly on a test machine includes a driven endless belt and a wheel retention structure to which the tire/wheel assembly is attached. The wheel retention structure includes a vertical load application system and a lateral load application system. First and second laser measurement gages are directed to an inboard rim flange of the wheel. According to the method, the radial deflection of the tire/wheel assembly is measured to develop a plurality of radial deflection values. The axial deflection of the tire/wheel assembly is measured to develop a plurality of axial load deflection values. A plurality of vertical loads applied by the vertical load application system are specified to a data processing system. A plurality of lateral loads applied by the lateral load application system are also specified to the data processing system. The data processing system correlates radial deflection values, lateral deflection values, vertical loads, and lateral loads. A value for radial stiffness and lateral stiffness may be provided based upon the correlations.

According to other aspects of the method, a plurality of lateral loads may be maintained at zero to provide a value for ride stiffness based upon the correlations. The vertical load application system may be selectively adjusted to simulate application of selected vertical load levels on the tire/wheel assembly. The steering input system may be adjusted to develop lateral forces that are a predetermined function of the vertical load levels applied by the load application system.

These and other aspects of this development will be better understood with reference to the attached drawings and the following detailed description of the illustrated embodiments.

DETAILED DESCRIPTION OF THE PREFERRED EMBODIMENT(S)

Figure 1:
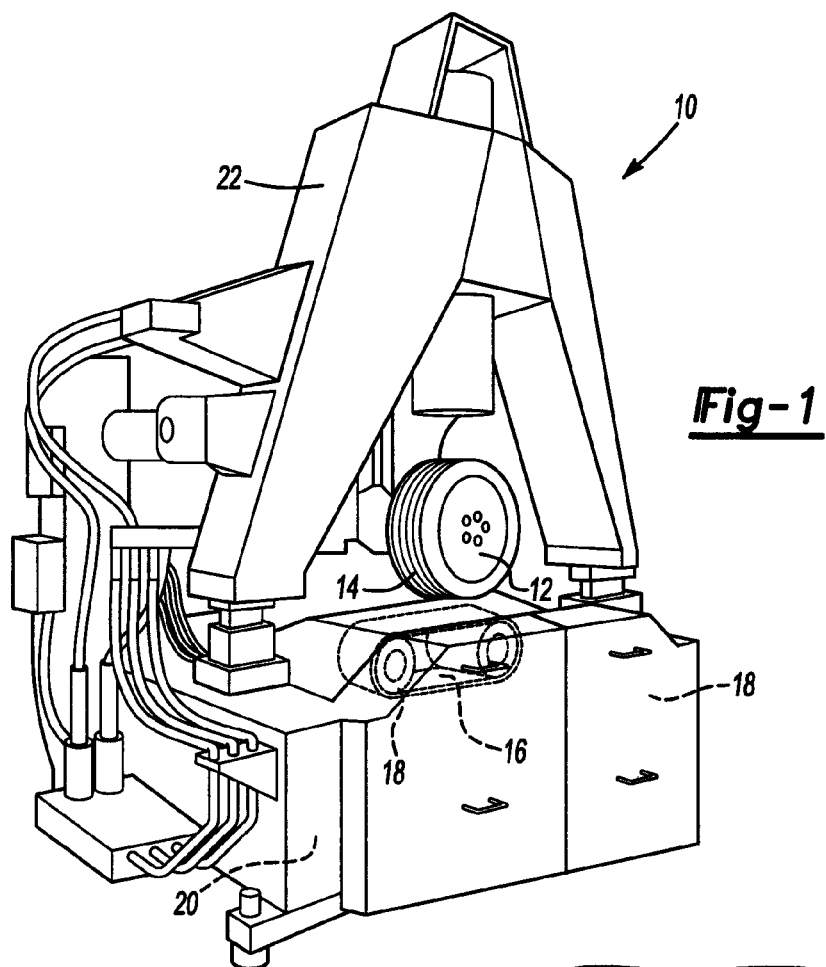
FIG. 1 is a perspective view of a tire/wheel test machine.

FIG. 1 illustrates a test machine 10 that is used to test a wheel 12 and a tire 14 that are run on an endless belt 16. The wheel 12 and tire 14 may be referred to as a wheel/tire assembly 12, 14. The endless belt 16 of the test machine 10 is entrained around a pair of belt drive rollers 18. One of the belt driver rollers 18 is operatively connected to a motor 20 that is used to rotate the belt drive rollers 18 and, in turn, the endless belt 16. The wheel/tire assembly 12, 14 is secured to a wheel retention structure that comprises an inverted "V" shaped tower.

Figure 2:
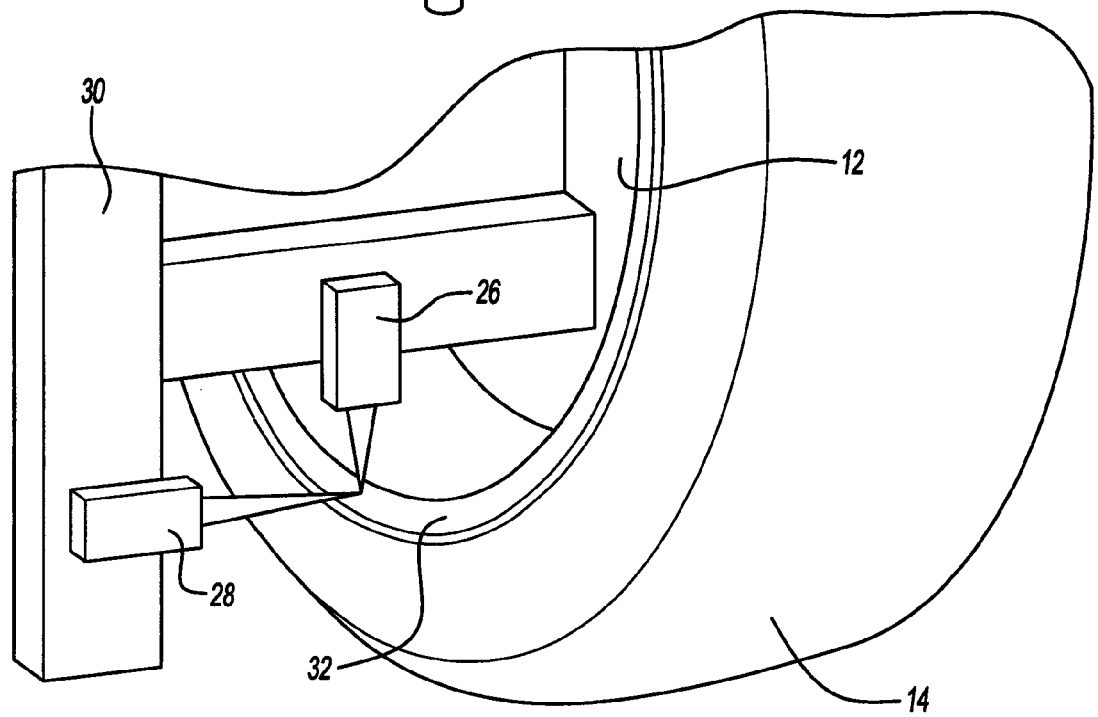
FIG. 2 is a fragmentary perspective view of a tire/wheel assembly on the test machine that has first and second laser measurement gages for measuring lateral and radial displacement of the inboard rim flange of the wheel.

Referring to FIG. 2, a wheel 12 and tire 14 are shown assembled to the wheel test machine 10. A first laser measurement gage 26 and a second laser measurement gage 28 are attached to a fixture 30. The fixture 30 holds the first and second lasers 26, 28 in a position to direct a beam of laser light onto a surface of wheel 12. The inboard rim flange 32 of the wheel 12 is impinged upon by the laser beam, as shown. While the inboard rim flange 32 is the illustrated measurement location, other locations may be used within the scope of the present invention. The embodiment of FIG. 2 is well adapted to measuring larger wheels where there is sufficient clearance to place the first laser 26 inside the cavity of the wheel 12 so that it may direct the laser beam radially onto the inboard rim flange 32 of the wheel 12.

Figure 3:
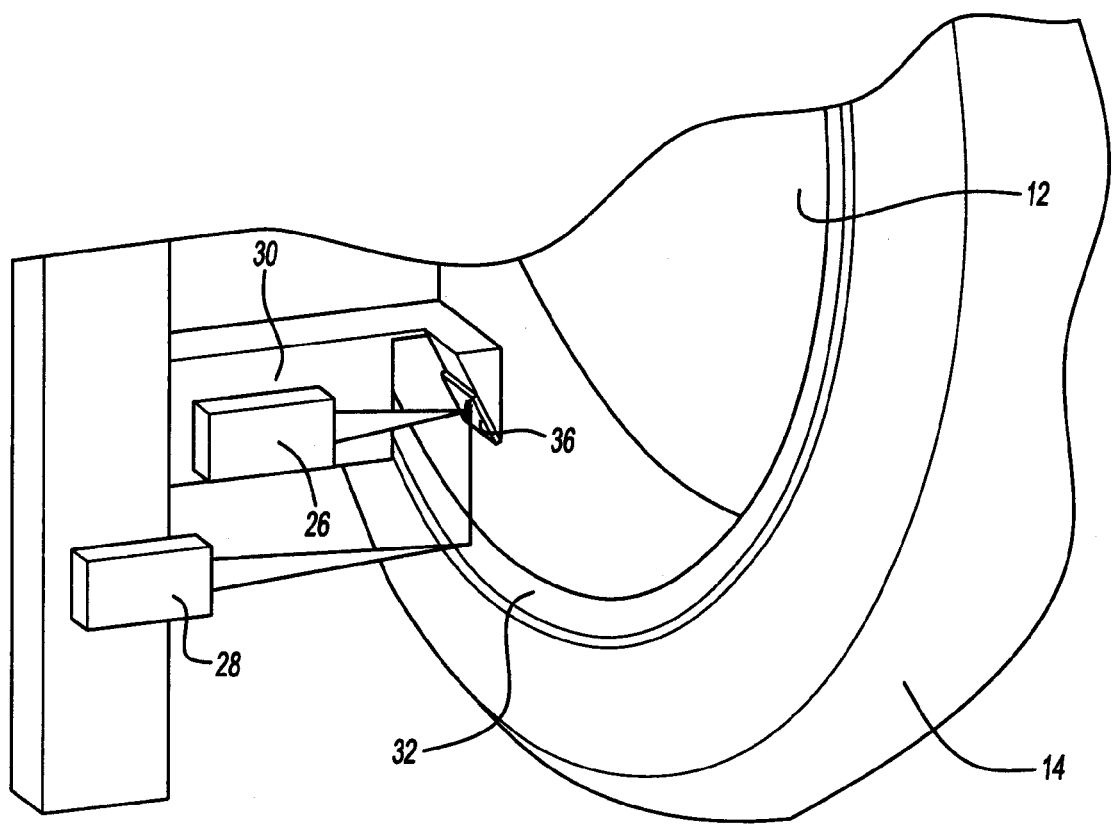
FIG. 3 is an alternative embodiment of a wheel on a tire/wheel test machine that has first and second laser measurement gages for measuring lateral and radial displacement of the inboard rim flange of the wheel.

Referring to FIG. 3, an alternative embodiment is shown in which a wheel 12 and tire 14 are assembled to the wheel test machine 10. The first laser measurement gage 26 and the second laser measurement gage 28 are secured to the fixture 30. In this embodiment, which is primarily intended for smaller diameter wheels, the first laser measurement gage 26 is provided with a mirror 36. The first laser measurement gage 26 directs a laser beam in an axial direction that is reflected by the mirror 36 in a radial direction to the inboard rim flange 32 in a radial direction. The second laser measurement gage 28 directs a laser beam to the inboard rim flange in an axial direction. The first laser measurement gage 26 measures radial displacement of the inboard rim flange 32 of the wheel 12. The second laser measurement gage 28 measures the axial displacement of the inboard rim flange 32 of the wheel 12.

With the embodiment of either FIG. 2 or 3, the first and second laser measurement gages 26 and 28 are used to measure the radial and axial displacement of the inboard rim flange 32 as the test machine 10 rotates the tire/wheel assembly 12, 14 on the endless belt 16. The test machine 10 applies variable vertical loads to the tire/wheel assembly that correspond to variations in the load applied to the tire/wheel assembly in normal operation. The test machine 10 also includes a steering input system that simulates turning the wheel on a road and the lateral load applied to the tire/wheel assembly.

Figure 4:
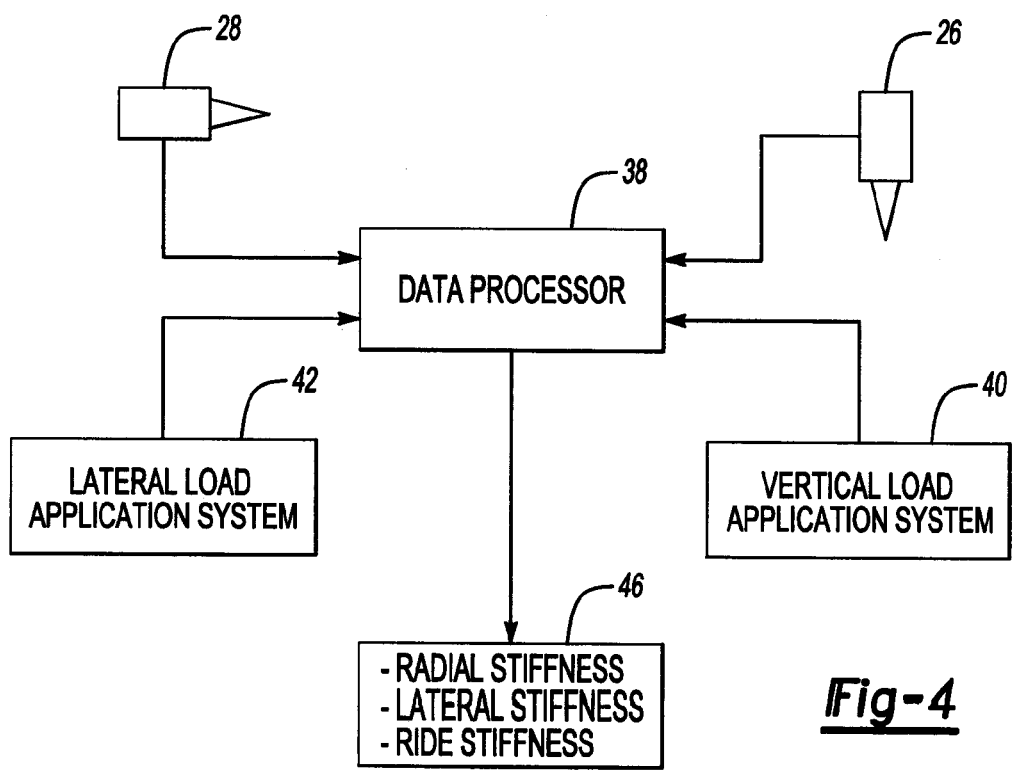
FIG. 4 is a diagrammatic flowchart of the data processing system that correlates displacement data from the first and second laser measuring gages and load inputs from the test machine to provide radial stiffness, lateral stiffness and ride stiffness values.

Referring to FIG. 4, the system is diagrammatically illustrated with the first laser measurement gage 26 measuring radial displacement of the wheel 12 while second laser measurement gage 28 measures the lateral displacement of the wheel 12. The measurements of the respective radial and lateral displacements are provided to a data processor 38. In addition to displacement measurements, the data processor 38 also obtains data from a vertical load application system 40 and the lateral load application system 42 of the test machine 10. The displacement and load data is correlated to provide calculations corresponding to the radial, lateral and ride stiffness of a given tire/wheel assembly in the form of various test reports represented by block 46 in FIG. 4.

The test machine may be a "flat trac" machine, such as that available from MTS Systems Corporation of Eden Prairie, Minn. Flat trac machines are generally used to obtain force and moment data for tires. According to either embodiment of the present invention, the test machine is equipped with lasers to accurately measure displacement of the wheel with respect to various input forces simulating the loading of the wheel as experienced when the wheel and tire are on a vehicle.

The first and second laser measurement gages 26, 28 may be focused at the 6 o'clock position on the inboard rim flange 32. The first laser measurement gage 26 measures the radial deflection of the rim flange 32, while the second laser measurement gage 28 measures the axial, or lateral, deflection of the rim flange 32.

According to one example of a test procedure that may be implemented with either embodiment described above, the test machine 10 may be used to set vertical loads of 25, 37.5 and 50% of the gross vehicle weight (GVW). These loads represent 0, 50 and 100% weight transfer for the GVW of a passenger car. Steering inputs were then generated to develop lateral forces of 0, 10, 20, 30, 40, 50, 60 and 70% of the vertical load.

Radial displacement was measured over the range of gross vehicle weight values for lateral loads of between 0 and 1600 pounds per inch. Similarly, lateral displacement was measured for the 25% GVW, 37.5% GVW, and 50% GVW with lateral loads of between 0 and approximately 1600 pounds being applied to the tire/wheel assembly during testing. Displacements for each GVW value were then charted and the slope of the three GVW plots were averaged to develop a value for lateral stiffness. Similarly, lateral displacement was determined by plotting three different displacements versus lateral load values for each of the respective GVW values. The average slope of the lines plotted was determined to be the radial stiffness value.

Ride stiffness was evaluated by determining the radial rate of displacement versus the radial displacement when 0 lateral force is applied by the steering control system.

In the course of the testing, variables that were controlled include the forces applied by the vertical and lateral load application systems of the test machine, tire pressure, speed of rotation, and camber angle. The system also utilized a prescribed warm-up method to guard against erroneous data. The test was subject to certain noise factors including tire size, tire construction and tire condition.

While the best mode for carrying out the invention has been described in detail, those familiar with the art to which this invention relates will recognize various alternative designs and embodiments for practicing the invention as defined by the following claims.

What is claimed:

1. A test machine for testing a tire/wheel assembly comprising:
   a driven endless belt;
   a wheel retention structure to which the tire/wheel assembly is attached with the tire rotating on the endless belt;
   a first laser measurement gage is directed to an inboard rim flange of the wheel to measure radial deflection of the tire/wheel assembly; and
   a second laser measurement gage is directed to the inboard rim flange to measure axial deflection of the tire/wheel assembly.

2. The test machine of claim 1 further comprising a data processing system that receives a plurality of measurement values from the first and second laser measurement gages.

3. The test machine of claim 2 wherein the wheel retention structure has a vertical load application system that may be selectively adjusted to simulate the application of selected vertical load levels on the tire/wheel assembly.

4. The test machine of claim 1 wherein the wheel retention tower has a vertical load application system that may be adjusted to simulate the application of selected vertical load levels on the tire/wheel assembly.

5. The test machine of claim 1 further comprising a fixture that supports the first and second lasers proximate the tire/wheel assembly when attached to the wheel retention structure.

6. The test machine of claim 5 wherein the first laser measurement gage is attached to the fixture to direct a laser beam axially toward a mirror that is attached to the fixture within the radial plane of the inboard rim flange that directs the laser beam in a radial direction.

7. The test machine of claim 1 wherein the wheel retention structure has a steering input system that may be selectively adjusted to simulate the application of lateral forces on the tire/wheel assembly.

8. The test machine of claim 7 wherein the wheel retention structure has a vertical load application system that may be selectively adjusted to simulate the application of selected vertical load levels on the tire/wheel assembly, wherein the steering input system is adjusted to develop lateral forces that are a predetermined function of the vertical load levels applied by the load application system.

9. The test machine of claim 8 further comprising a data processing system that receives a plurality of measurement values from the first and second laser measurement gages at a plurality of selected vertical load levels to develop a radial displacement profile.

10. The test machine of claim 8 further comprising a data processing system that receives a plurality of measurement values from the first and second laser measurement gages at a plurality of selected lateral load levels to develop a lateral displacement profile.

11. The test machine of claim 8 further comprising a data processing system that receives a plurality of measurement values from the first and second laser measurement gages at a plurality of selected vertical load levels, wherein the tire/wheel assembly is subjected to zero lateral load and the radial rate is calculated to develop a value for ride stiffness.

12. A method of testing a wheel/tire assembly on a test machine having a driven endless belt, a wheel retention structure to which the tire/wheel assembly is attached with the tire rotating on the endless belt, the wheel retention structure having a vertical load application system and a steering input system, a first laser measurement gage is directed to an inboard rim flange of the wheel, and a second laser measurement gage is directed to the inboard rim flange, the method comprising:
  measuring the radial deflection of the tire/wheel assembly to develop a plurality of radial deflection values;
  measuring the axial deflection of the tire/wheel assembly to develop a plurality of axial load deflection values;
  specifying a plurality of vertical loads applied by the vertical load application system;
  specifying a plurality of lateral loads applied by the lateral load application system;
  preparing correlations of the radial deflection values, lateral deflection values, vertical loads and lateral loads; and
  providing a value for radial stiffness and lateral stiffness based upon the correlations.

13. The method of claim 12 further comprising specifying that the plurality of lateral loads are all at zero lateral force and providing a value for ride stiffness based upon the correlations.

14. The method of claim 12 further comprising selectively adjusting the vertical load application system to simulate application of selected vertical load levels on the tire/wheel assembly.

15. The method of claim 14 further comprising adjusting the steering input system to develop lateral forces that are a predetermined function of the vertical load levels applied by the load application system.

16. The method of claim 12 further comprising adjusting the steering input system to develop lateral forces that are a predetermined function of the vertical load levels applied by the load application system.

* * * * *